United States Patent [19]

Zato

[11] Patent Number: 4,574,163
[45] Date of Patent: Mar. 4, 1986

[54] DIGITAL RADIO TELEPHONE
[75] Inventor: Thomas J. Zato, Palatine, Ill.
[73] Assignee: Zenith Electronics Corporation, Glenview, Ill.
[21] Appl. No.: 554,424
[22] Filed: Nov. 22, 1983
[51] Int. Cl.[4] ............................................. H04Q 7/04
[52] U.S. Cl. ................................... 179/2 EA; 375/2.1
[58] Field of Search ................ 179/2 E, 2 EA, 2 EB, 179/2 EC, 1.5 R, 1.5 E; 375/2.1, 2.2

[56] References Cited

U.S. PATENT DOCUMENTS

| | | | |
|---|---|---|---|
| 4,171,513 | 10/1979 | Otey et al. | 375/2.1 |
| 4,179,657 | 12/1979 | Hobbs | 375/2.1 |
| 4,467,141 | 8/1984 | Resch et al. | 179/2 EA |

OTHER PUBLICATIONS

*Electronics*, vol. 49, No. 15, Jul. 22, 1976, pp. 8E, 10E, "Marconi Introduces Digital Family for Encrypting Civilian Transmissions".

*IBM Technical Disclosure Bulletin*, vol. 21, No. 5, Oct. 1978, pp. 2156–2157, Waldbaum, "Cryptographic Voice Communications Using Digital Data Processing Devices".

*Intelcon 79 Exposition Proceedings*, Feb. 26–Mar. 2, 1979, pp. 10–13, deLellis, "Linear Prediction Techniques for Digital Secure Voice Systems."

*Primary Examiner*—Thomas W. Brown
*Assistant Examiner*—W. J. Brady

[57] ABSTRACT

A two-way digital radio telephone system includes means for transmitting by RF carrier 16 bit binary words including a start bit, a six bit identification code and eight bits of information comprising either an audio sample or a function code, as indicated by an audio/function bit. The carrier is detected and each word serially loaded into a receive shift register which is parallelly unloaded with the identification code being supplied to a comparator and the information data being supplied to a D/A converter. If the comparator yields an identity with the predetermined 6 bit identification code, a D/A converter output is supplied to an amplifier which feeds a conventional telephone coil. The signal is retransmitted on another carrier by a parallelly loaded and serially unloaded transmit shift register which generates a similar binary word including an identification code, digitized audio or function data and the appropriate audio/function bit.

5 Claims, 5 Drawing Figures

DIGITAL RADIO TELEPHONE

BACKGROUND OF THE INVENTION AND PRIOR ART

This invention relates generally to radio telephone communication systems having a base station and a remote station and specifically to a method and means for operating such systems to produce enhanced security.

Presently the Federal Communications Commission authorizes a very limited number of FM broadcast channels for two-way wireless telephone communications. Such two-way telephone systems provide operation substantially similar to that experienced with conventional wired telephones by using two different frequency carrier signals for each installation. With the arrangement, a person speaking into the microphone or hand set of the remote station can hear his own voice in his receiver because the signal is relayed back to him by the base station as well as sent out along the telephone lines. This type of operation requires one carrier for transmission and another carrier for reception.

Because of the small number of allocated carrier frequencies, the number of combinations of transmitter and receiver carrier frequencies is extremely limited. While in many instances this is not a serious problem, generally because the range of the transmitters is quite short and the actual number of systems in use is still small, the "privacy" of these telephone systems leaves much to be desired. Further, there have been instances where unauthorized users have managed to "contact" a base station with a wireless transmitter of proper frequency and place telephone calls thereover. Such calls obviously are charged to the person to whom the base station is registered, rather than to the actual user.

In an effort to thwart "eavesdropping" and unauthorized use, manufacturers have built systems wherein an address code is needed to contact the base station and vice versa. One such system is said to provide a binary address yielding 256 different code combinations, a specific one of which must be transmitted by a remote unit to contact its base station. However, in all such systems, the limited number of carrier frequencies assigned makes it relatively easy to eavesdrop, and while an identification code may minimize unauthorized calls over a base station, the privacy of such telephone systems is still easily compromised because of the retransmission feature mentioned above, which makes both parties conversation susceptible to eavesdropping.

Consequently, there is a need in the art for a two-way radio telephone communication system of enhanced privacy.

OBJECTS OF THE INVENTION

A principal object of the invention is to provide an improved two-way radio telephone communication system.

Another object of the invention is to provide a two-way radio telephone communication system which is not readily susceptible to eavesdropping.

A further object of the invention is to provide a digital radio telephone system.

SUMMARY OF THE INVENTION

In accordance with the invention, a method and apparatus are provided for operating a two-way digital telephone communication system between a base station and a remote station. Both stations have an identification address and include means for digitizing analog information. Transmission is by packets or words of digital data, each packet including the identification address and the information.

BRIEF DESCRIPTION OF THE DRAWINGS

Other objects and advantages of the invention will be apparent from reading the following description thereof in conjunction with the drawings in which.

DESCRIPTION OF THE PREFERRED EMBODIMENT

Figure 1:
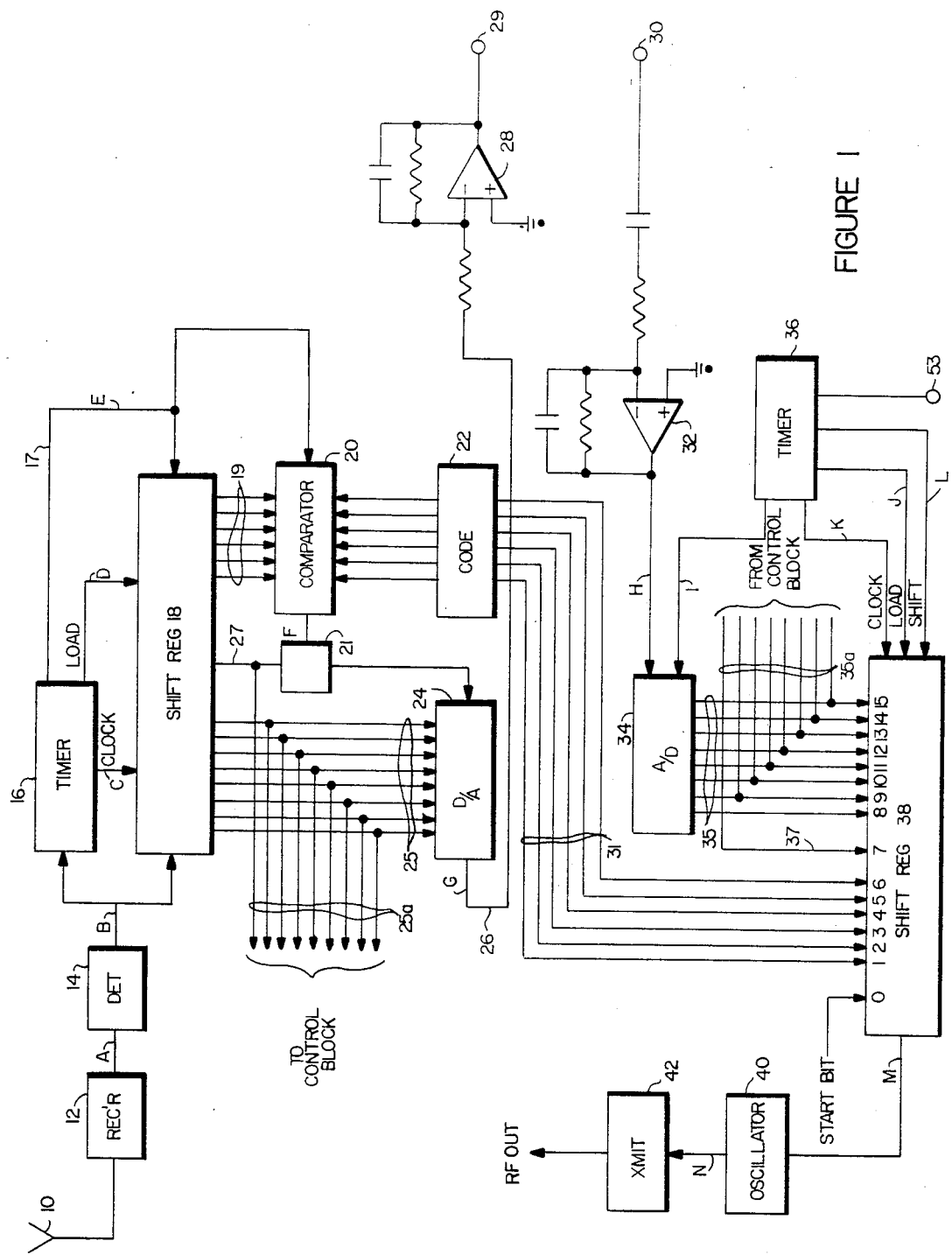
FIG. 1 represents a partial block diagram of a digital radio telephone system constructed in accordance with the invention.

Referring to FIG. 1, an antenna 10 is coupled to a receiver 12 which is tuned to accept one of the FCC allocated channels for two-way radio telephone communications. For example, receiver 12 may be tuned to accept signals of 49.830 MHz from a transmitter in a companion station. The output of receiver 12 is supplied to an envelope detector 14 which, in a well-known manner, derives the modulation from the carrier signal. Detector 14 supplies a timer 16 and a receive shift register 18. Timer 16 is conventional and produces a clock signal (C), a load signal (D) and a shift enable signal (E) in timed relationship with each other. The clock signal (C) and load signal (D) are supplied to shift register 18. The shift enable signal (E) is supplied over an enable lead 17 to shift register 18 and to a comparator 20.

Shift register 18 has six identification leads 19 coupled to comparator 20, a select lead 27 coupled to a control block (not shown in this figure) and to a gate 21, and eight data output leads 25 coupled to a digital to analog converter 24. The data on the data output leads are also supplied, over a plurality of leads 25a, to the control block. The other six inputs of comparator 20 are supplied with a six bit identification or address code from a code generator 22. The output of comparator 20 is supplied to gate 21, and depending upon the signal on select lead 27, is passed on to a D/A converter 24. The output of D/A converter 24 is supplied over a lead 26 to the input of a buffer amplifier 28, the output of which is supplied to a terminal 29.

The above circuit functions to receive a transmitted signal of appropriate carrier frequency, detect the signal, decode the signal and, if it is determined to represent audio information, derive an analog version of the digital data therein for application to terminal 29. The above-described receiver circuitry is duplicated in both the base station and the remote station with suitable and obvious changes in the frequency to which receiver 12 is tuned.

The transmit portion of the circuitry, which is also duplicated in both the base station and the remote station, comprises an input terminal 30 supplying a buffer amplifier 32 which has an output feeding an analog to digital (A/D) converter 34 having a plurality of leads 35 for providing eight binary bits to a transmit shift register 38. An asynchronous timer 36 is supplied with a control signal at terminal 53, and in response thereto, supplies a convert signal to A/D converter 34. Timer 36 also supplies a clock signal, a load signal, and a shift enable signal to shift register 38. Shift register 38 also receives function code information from the control block over a plurality of leads 35a and a function/audio bit over a select lead 37. This bit identifies the eight bit data as either audio data or function data and the signal on terminal 53 disables the D/A converter 34 when function data is being transmitted. The output of shift register 38 is supplied to an oscillator 40, which in turn supplies an RF transmitter 42 for generating an appropriate frequency FM carrier, different from 49.830 MHz. For example, a transmit frequency of 49.890 MHz may be used.

Figure 2:
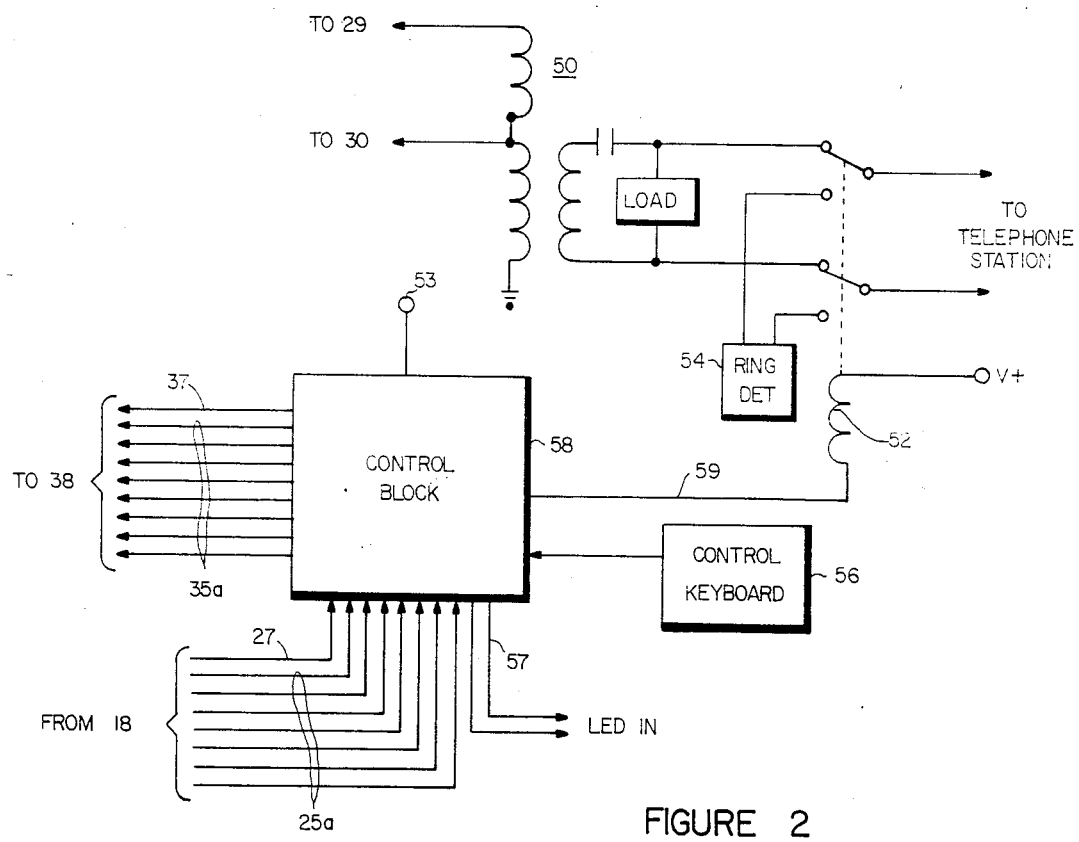
FIG. 2 represents additional circuitry for use with FIG. 1 in a base station.

In FIG. 2, the additional circuitry used in the base station is shown. A conventional telephone coil 50 is connected to terminals 29 and 30 and is coupled to the telephone line by a conventional telephone relay 52. A control block 58 is coupled to relay 52 through a ring detector 54 and to a control keyboard 56. Control block 58 supplies function control signals to relay 52 over a lead 59 for conventional telephone operation and also supplies coded digital function data to transmit shift register 38 in FIG. 1 over leads 35a and select lead 37. The control block, in turn, is supplied with digital data by select lead 27 and leads 25a from receive shift register 18 in FIG. 1. A signal output to terminal 53 indicating the presence of audio/function data is sent to timer 36 for control of A/D converter 34 in FIG. 1. A pair of leads 57 supply LED indicators, not shown, for indicating the status of the base station.

FIG. 1 should be viewed in conjunction with FIG. 2 with terminals 29, 30 and 53 overlying each other to obtain the full schematic diagram of the base station. Normal telephone control functions, such as hook switch operation for answering or placing a call and number dialing may be performed from a handset (not shown) at the base station or from the remote station by transmission of appropriate function signals to the base station for conversion into appropriate function control signals for application to relay 52.

Figure 3:
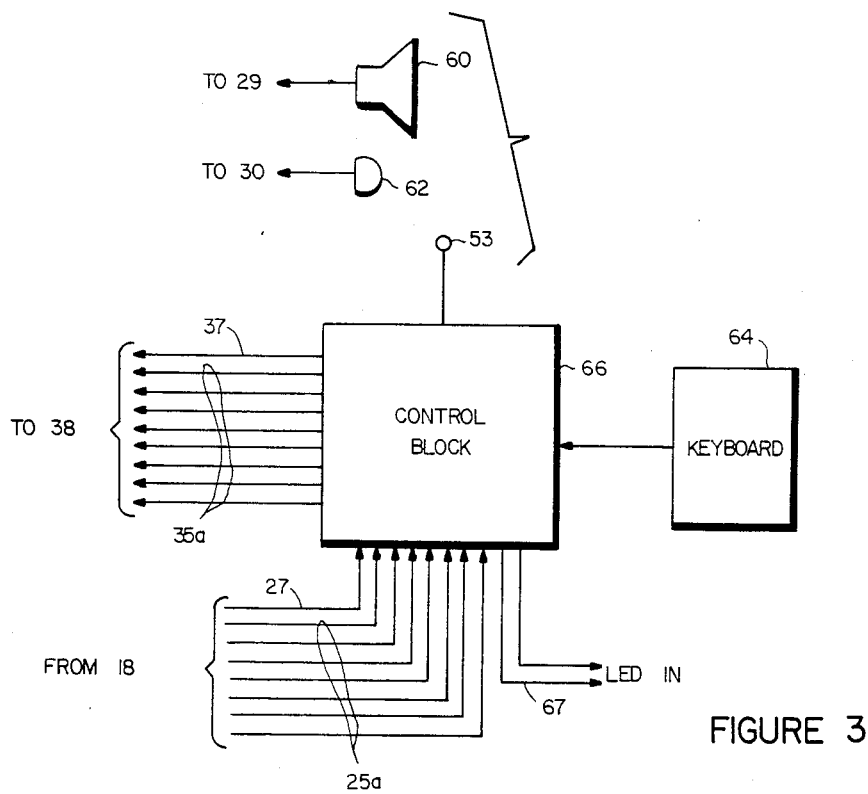
FIG. 3 represents additional circuitry for use with FIG. 1 in a remote station.

In FIG. 3, the additional circuitry used in the remote station is shown. A speaker 60 is connected to terminal 29 and a microphone 62 is connected to terminal 30. A control block 66, similar to control block 58, is supplied from a keyboard 64 and sends coded digital function data over the eight output leads 35a and the select lead 37. Coded function information is received from register 18 over leads 25a and an appropriate function bit is received from select lead 27. Terminal 53 is similarly supplied with an appropriate signal when function data is being sent. Leads 67 are coupled to a plurality of LED indicators (not shown) for indicating the functional mode of the remote station. FIG. 3 should be viewed in conjunction with FIG. 1 with terminals 29, 30, and 53 overlying each other to obtain the complete schematic diagram of the remote station.

It should be apparent that many ancillary features, such as automatic redial, call waiting, coded dialing, base and remote station intercom and signaling and the like may be incorporated in the telephone system. Such additional capabilities are not required to understand the invention and are therefore not discussed herein.

OPERATION

Figure 4:
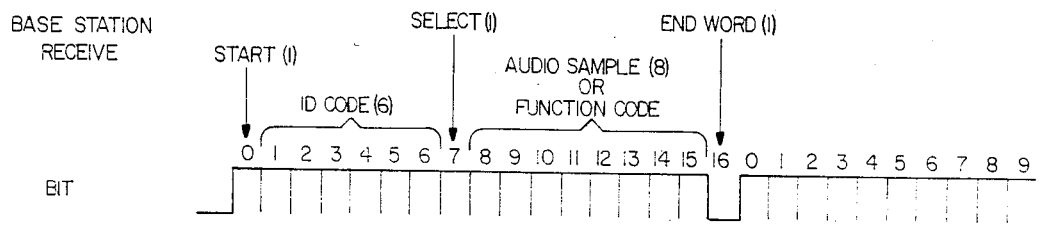
FIG. 4 is a series of waveforms of sample digital signals at various points on FIG. 1 when the base station receives a signal.
Figure 4:
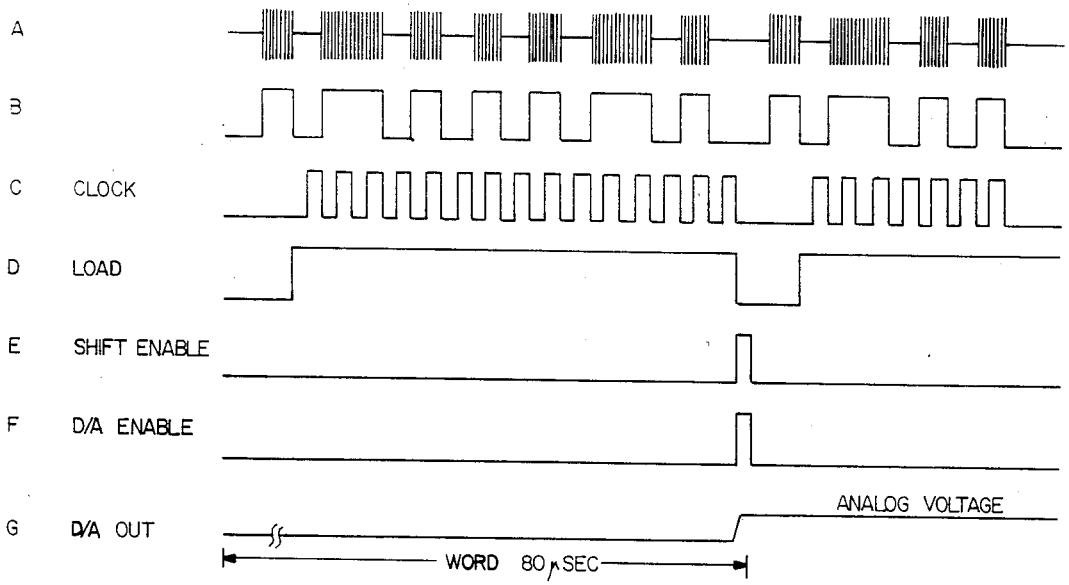
Figure 5:
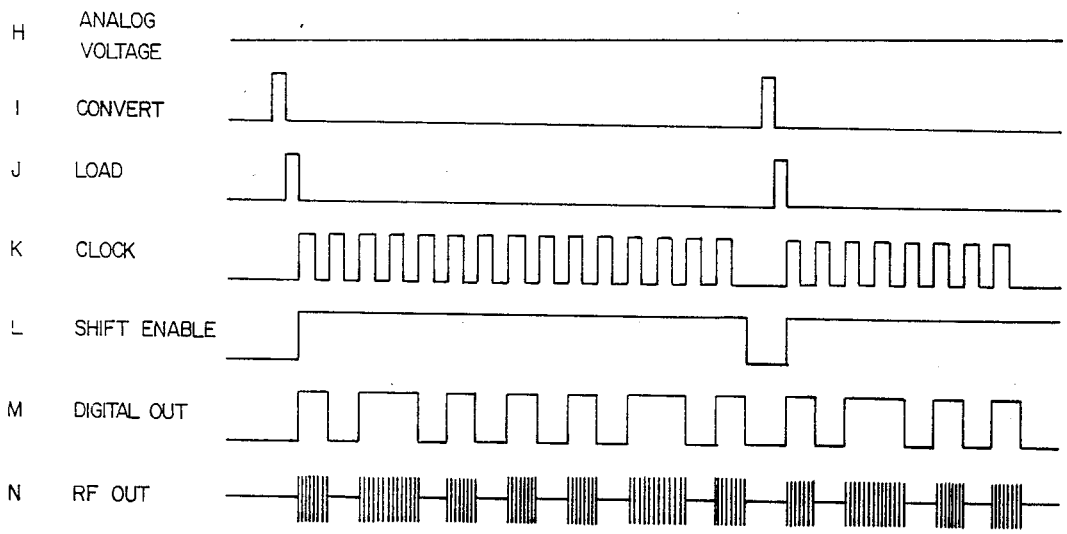
FIG. 5 is a series of waveforms similar to those in FIG. 4 when the base station transmits a signal.

The waveforms of FIGS. 4 and 5 and the diagrams of FIGS. 1, 2 and 3 should be consulted for a clear understanding of the operation of the telephone system of the invention. FIG. 4 in labelled base station receive and the lettered waveforms A-G exemplify reception of a signal. As should be apparent, the system of the invention is digital and transmits packets of digital data comprising binary words of 16 bits each. At the top of FIG. 4 a description of the different 16 bits is given. The first bit is numbered 0 and is characterized as a start bit of constant logic level 1. The next 6 bits are devoted to the identification or address code and bit number 7 (the 8th bit) is the select bit. This bit is a logic 1 when function data is being sent and logic 0 when audio data is being sent. The remaining 8 bits in the 16 bit word represent either a digitized audio sample or a coded function command, depending upon the state of the select bit. Another bit is included at the end of each complete word and has a fixed logic 0 level. Successive packets of data are transmitted with the same bit identification scheme. While the system disclosed incorporates a 16 bit word, it will be readily apparent that longer or shorter word lengths may be used with obvious changes in the circuitry.

The logic 1 level bits are defined by a predetermined duration or burst of RF carrier frequency of predetermined minimum amplitude. The logic 0 bits are indicated by identical durations of 0 RF amplitude. Thus waveform A, which represents a sample output of receiver 12, comprises a plurality of bursts of RF frequency corresponding to the bit sequence being transmitted. In the signal illustrated, the number 0 start bit is 1, the number 1, 4 and 6 bits in the ID code are 0, and the second, third and fifth bits are 1. The select bit (number 7) is 1 indicating that the following eight bits (number 8-15) comprise an audio sample and not a coded function.

The output of the envelope detector is illustrated by waveform B and is a square wave signal corresponding to the envelope of the modulated RF carrier shown in A. The clock signal waveform C is developed by synchronous timer 16, the operation of which is initiated by the start bit. The clock signal C is seen to be delayed slightly with respect to the load signal D, which is generated by the trailing edge of the start bit. Shift register 18 is serially loaded with the bit stream in a conventional manner with the ID code bits being loaded first and the audio or function data being loaded last. Thus the ID code will appear on leads 19 of shift register 18 and the audio or function data on leads 25.

The bit information in shift register 18 is read out in parallel upon generation of the shift enable signal E by timer 16 and appears on leads 19, 27 and 25. The appropriate six bit address code (which is predetermined for the transmitter used with the base station) is fixed in code generator 22 and supplied to one set of inputs of comparator 20 where it is compared with the ID code bits on leads 19 of shift register 18. If a match is determined by the comparator, the D/A enable signal F is supplied to gate 21 to enable D/A converter 24 to process the bit information on leads 25 from shift register 18 if the select bit input to gate 21 indicates audio data. In that event the D/A output, as indicated by waveform G, is an analog voltage, the actual level of which is defined by the bit word. If a function code is included, the select bit will be 0 and gate 21 will not enable D/A converter 24. In that event the information on leads 25 is used by control block 58 in FIG. 2. The bit and word length results in "packets of data" being sent approximately every 80 microseconds which yields approximately a 12½ KHz sampling rate, which is more than adequate for telephone communications.

FIG. 5 shows the waveforms for retransmission of the assumed signal from the base station. As indicated, waveform H may be a slowly rising analog voltage as indicated. This voltage is supplied from the output of amplifier 32 and is inputted via the telephone coil 50 in the base station. Audio signals received by the base station from the remote station develop appropriate voltages across telephone coil 50 which are retransmitted to the remote station over a different channel frequency to provide telephone performance comparable to wired units.

Timer 36 is asynchronous in the sense that it is not locked to the incoming signal as is timer 16. In response to the 1 level select bit, control block 58 applies an appropriate signal to timer 36 for developing a convert signal (waveform I) for enabling operation of D/A converter 34 and for developing clock, (waveform K) load (waveform J) and shift enable (waveform L) signals, appropriately displaced with respect to each other, to assure that transmit shift register 38 is parallelly loaded with all of the bit information. This bit information comprises a fixed 1 level start bit, the six bit ID code from code generator 22, the audio/function bit developed on select lead 37 and an eight bit audio sample from A/D converter 34.

The shift enable pulse L is maintained for the duration of the binary word to enable the clock signal K to serially clock out the entire contents of transmit shift register 38, beginning with the start bit and progressing through the six digit code, the select bit and the eight digit audio data. The digital output (waveform M) is supplied to oscillator 40 where the RF output (waveform N) from transmitter 42 is developed. If a transmission originates from the remote station, control block 66 (FIG. 3) functions to impress an appropriate function code, determined by the keys on keyboard 64, on leads 35a and select lead 37.

It will be recognized that the waveforms illustrate transmission of audio, not function, data. For function data, the select bit would be 0 and D/A converter 24 would not receive an enable signal from comparator 20. Thus no audio would be supplied to the telephone line. Similarly A/D converter 34 would not be activated and the information supplied to transmit register 38 would comprise function data generated in response to the function commands received from the remote station. It will also be obvious that different identification addresses may be used for the base and remote stations, if desired, with suitable changes in circuitry. The provision of the same ID address for both the base station and the remote station yields an obvious simplification without significant security compromise.

What has been described is a novel two-way radio telephone communication system in which a digital identification code precedes digitized audio or function data in transmitted binary words. It is recognized that numerous modifications and changes in the described embodiment of the invention will occur to those skilled in the art without departing from the true spirit and scope thereof. The invention is to be limited only as defined in the claims.

What is claimed is:

1. A method of wireless communication between a base station and a remote station in a radio telephone system comprising the steps of:
    assigning fixed digital identification addresses to said base station and to said remote station;
    converting audio data information and function data information to be transmitted between said stations into digital data; and
    transmitting said digital data in packets, each packet including an identification address, an audio/function signal for identifying said audio data and said function data and either said audio data information or said function data information.

2. The method of claim 1 wherein each packet comprises a binary word including a first group of bits defining address data, an audio/function bit and a second group of bits defining information data.

3. A radio telephone communication system of enhanced privacy comprising:
    a base station transmitting signals on a first frequency and receiving signals on a second frequency;
    a remote station transmitting signals on said second frequency and receiving signals on said first frequency;
    means for digitizing function data information and audio data information at each station;
    means for generating an identification address and an audio/function data bit at each station; and
    means for encoding signals transmitted between said station into binary words, each word including an identification address, an audio/function bit and either audio data or function data digitized information.

4. The radio telephone system of claim 3 wherein each binary word includes a first group of bits denoting an identification address, said audio/function bit and a second group of bits denoting said function data or said audio data.

5. In a two-way radio telephone communication system of the type including a base station and a remote station and means for transmitting information therebetween by two different fixed frequency RF signals, the improvement comprising:
    digitizing both audio and function information to be transmitted and transmitting data packets, each packet containing a binary address, an audio/function bit for determining whether audio or function information is being transmitted and binary information data corresponding to either function information or audio information whereby enhanced privacy is obtained.

* * * * *